(No Model.)
J. W. GRANTLAND.
NUT FASTENER.
No. 467,750. Patented Jan. 26, 1892.
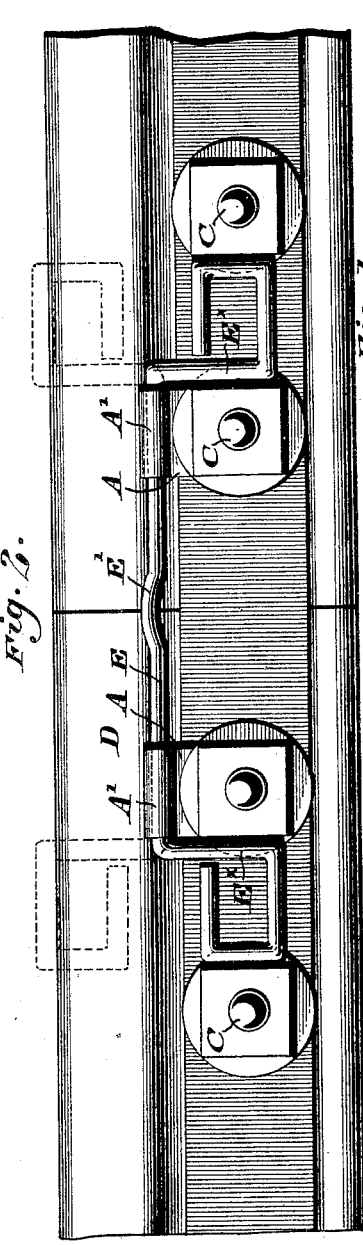
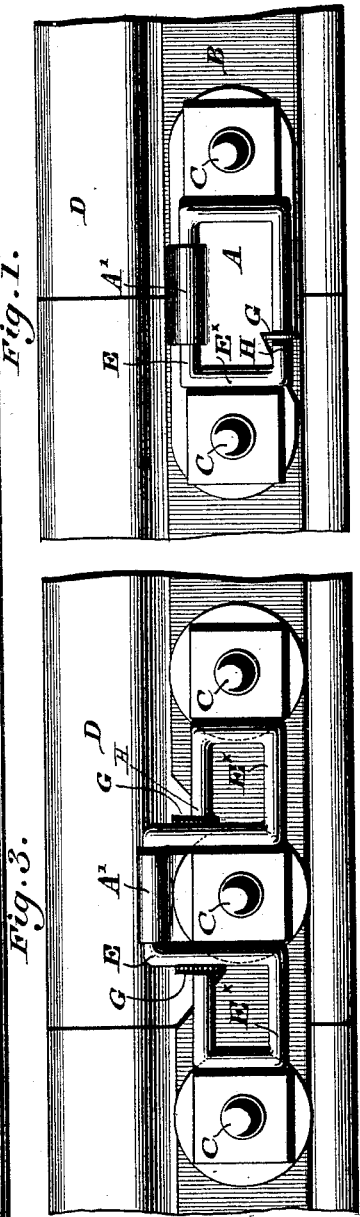
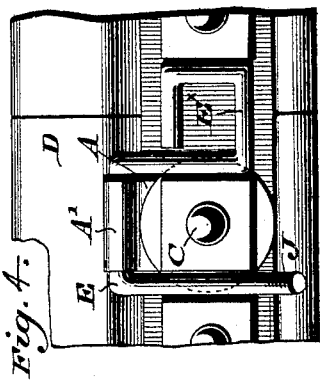
WITNESSES:
INVENTOR
John W. Grantland
BY
John A. Wiedersheim
ATTORNEY.

UNITED STATES PATENT OFFICE.

JOHN W. GRANTLAND, OF PHILADELPHIA, PENNSYLVANIA.

NUT-FASTENER.

SPECIFICATION forming part of Letters Patent No. 467,750, dated January 26, 1892.

Application filed June 24, 1891. Serial No. 397,294. (No model.)

*To all whom it may concern:*

Be it known that I, JOHN W. GRANTLAND, a citizen of the United States, residing in the city and county of Philadelphia, State of Pennsylvania, have invented a new and useful Improvement in Nut-Fasteners, which improvement is fully set forth in the following specification and accompanying drawings.

My invention relates to improvements in nut-fasteners; and it consists of a washer having an ear to form the bearings of an arm adapted to be placed in contact with a nut so as to prevent the rotation of the same.

Figure 1 represents a front view of a nut-fastener embodying my invention. Figs. 2 and 3 represent front views of modifications of the same.

Similar letters of reference indicate corresponding parts in the several figures.

Referring to the drawings, A designates a washer, preferably formed of sheet metal, having openings therein, whereby it may be placed on the ends of the bolts C, which are inserted in the web of the rail D. Secured in an ear A' on the washer A is an arm E, preferably consisting of a piece of heavy wire bent so as to form tongues $E^x$ for contact with the sides of the nut F when the latter is in place on the bolt. The arm E is so secured to the washer A that it may be swung out of the way of the nuts when it is desired to remove the latter from the bolts. To aid in keeping the tongues $E^x$ in place between the nuts a lip G, formed, of a raised or bent-up portion of the washer, is adapted to enter the space between the free end H of the tongue and the adjacent portion thereof.

In using the device the bolts C are passed through the fish-plates B and the web of the rail. The washer A is then placed on the bolts and the nuts screwed home on the bolts, when the arm E is oscillated or swung so as to bring a tongue $E^x$ between the said nuts, the lip G being against the free end H of the tongue and adjacent portion of the same, as has been stated.

In Fig. 2 is shown a modification of the device for securing four nuts. Two washers A, each having a single opening, are provided with an arm E, the latter formed of a heavy wire having tongues $E^x$ at each end, each tongue holding two nuts in place. The central portion of the wire is curved outward, forming a finger-piece E' for manipulating the arm E.

In Fig. 3 a single washer is employed, and the arm E has two tongues which are inserted in the two spaces between the nuts.

In Fig. 4, which is a form for three nuts, one end of the arm has a looped tongue, and on the other end the tongue passes between and is adapted to be in contact with two of the nuts and is bent outward and downward, as at J, so as to rest upon the flange of the rail.

The washer A is preferably of a single piece of metal with a bent portion forming the ear A', in which the wire forming the catch is loosely held. The limbs of the washer are elastic so as to be compressed by the nut and permit the latter to be rotated to the proper extent. The lug or lip G may be formed on the fish-plate wherever the free end of a tongue exists, as shown in Fig. 3.

Having thus described my invention, what I claim as new, and desire to secure by Letters Patent, is—

1. A nut-fastener consisting of a swinging piece of metal of loop form and a supporting-plate affording a bearing therefor, said swinging piece having its outer portions adapted to engage and lock a nut, the free end of the loop being separated from the adjacent portion, forming a space to receive a fastening-piece which lockingly engages with said end and portion, substantially as described.

2. In a nut-fastening, a looped piece of metal adapted to embrace a nut, the free end of the loop being separated from the adjacent portion, forming a space, in combination with a washer or plate having an outwardly-projecting lip which enters said space and locks with said end portion, substantially as described.

JOHN W. GRANTLAND.

Witnesses:
JOHN A. WIEDERSHEIM,
A. P. JENNINGS.